April 17, 1951  B. G. RICH  2,549,524
VEHICLE RADIATOR AND ENGINE MOUNTING
Filed April 15, 1948  2 Sheets-Sheet 1

INVENTOR.
BARRETT G. RICH
BY
ATTORNEYS

April 17, 1951 B. G. RICH 2,549,524
VEHICLE RADIATOR AND ENGINE MOUNTING
Filed April 15, 1948 2 Sheets-Sheet 2
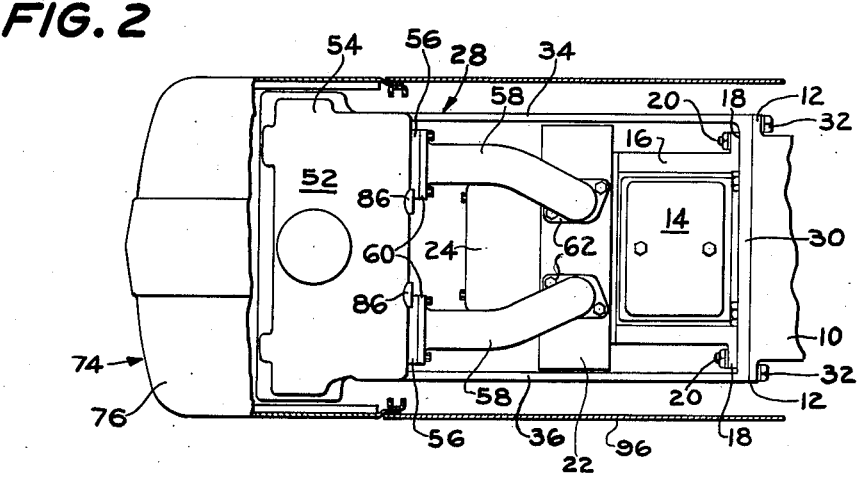
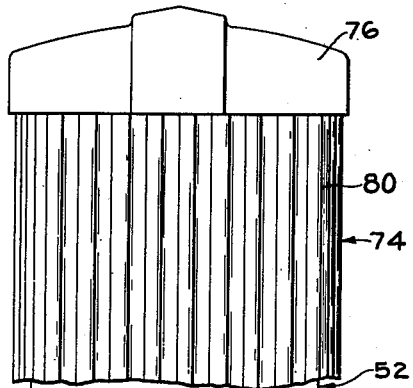
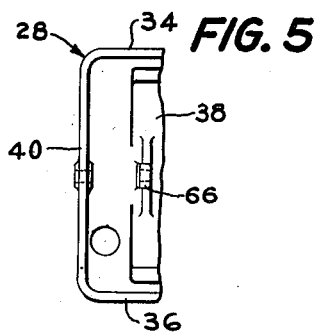
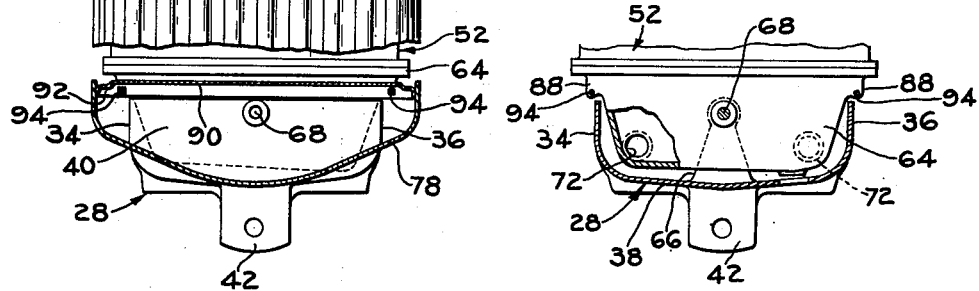
INVENTOR.
BARRETT G. RICH
BY
ATTORNEYS Patented Apr. 17, 1951

2,549,524

UNITED STATES PATENT OFFICE 2,549,524

VEHICLE RADIATOR AND ENGINE MOUNTING

Barrett G. Rich, Waterloo, Iowa, assignor to Deere Manufacturing Co., Dubuque, Iowa, a corporation of Iowa Application April 15, 1948, Serial No. 21,294

1 Claim. (Cl. 180—68)

This invention relates to a vehicle construction and more particularly to the means for mounting an internal combustion engine and radiator therefor. Although the invention in its broader aspects is applicable to vehicles in general, the preferred embodiment of the invention has been developed primarily for use in agricultural or industrial tractors.

The usual tractor includes a main body having a longitudinally extending forward section including opposite side rails between which an internal combustion engine is carried and at the forward end of which a cooling radiator is carried. In some tractors, the engine is mounted directly on the side rails of the front section; and in other tractors the engine is carried rigidly on a rear body portion comprising a transmission and differential casing or housing. The latter construction is especially peculiar to tractors of the type in which the internal combustion engine is so disposed that the crank shaft axis is transverse to the longitudinal axis of the tractor, in which case the transmission and differential casing also includes the crank case structure of the engine, the engine block projecting forwardly therefrom between the rails of the front section so that the pistons in the engine reciprocate in parallelism with the longitudinal or principal axis of the tractor.

In either of the cases mentioned above, and in any vehicle in general, there will be a certain amount of relative movement between the internal combustion engine and the vehicle or tractor body, particularly the forward portions of the body that are relatively remote from the engine. In conventional construction, the cooling radiator is carried at the forward part of the tractor body section, and an engine hood structure extends rearwardly therefrom to a cowl or equivalent support just behind the engine and ahead of the operator's station. The hood structure is carried at its rear portion on this cowl or support and is carried at its front end on a radiator grille structure, which is ordinarily carried by the tractor frame. In one typical construction, the lower portion of the radiator and lower portion of the grille structure are carried at laterally spaced points thereon by correspondingly laterally spaced points on the body, with the result that the radiator and grille structure become an inverted pendulum rockable from side to side as the body or frame section twists generally about a longitudinal axis. It is immaterial whether this twisting is caused by vibration set up by the engine or by operation of the vehicle over uneven terrain; the results are the same. Since the forward portion of the front body section is relatively remote from the part of the body to which the engine is connected, the relative movement between the engine and radiator and grille structure is of considerable magnitude. Lateral rocking and shaking of the radiator and grille structure as aforesaid would be transmitted through the hood structure to rear parts of the tractor, such as the cowl or dash and even to the fenders for the rear wheels, ultimately resulting in damage to these parts and even damage to the radiator itself, this result following whether the radiator and grille structure were rigidly or resiliently carried by the front frame section.

According to the present invention, it is an important object to carry the radiator, grille structure and hood structure rigidly on the engine so that these parts are separated from the undesirable vibrational or twisting effects of the frame section. An important object in this respect is to control the vibrational effect on these parts by means mounting these parts on the body or frame section at a portion of the vehicle that has the least operational deflection. Specifically, it is an important object of the invention to provide a radiator mounting means including a mounting structure carrying the radiator substantially on the longitudinal axis of relative movement or twisting between the body and engine. In connection with the achievement of this object, it has been determined that a longitudinal axis substantially centrally located between side rail portions of the main body or frame section and at a level considerably below the top of the engine, provides a center on which such mounting structure can be carried, since this center or axis is convenient to the lower portion of the radiator and the mounting can be accomplished without departing too far from conventional over-all tractor designs. It has further been determined that vibrations of the engine are of minor magnitude; therefore, it becomes expedient to connect the radiator to the engine by a rigid mounting, which minimizes vibration of the radiator, and to connect the radiator to the frame on the aforesaid axis so that a minimum amount of vibration will be transmitted from the frame to the radiator.

Another object is to mount the radiator grille or enclosure structure on the radiator independently of the body or frame section, and, further, to mount the forward part of the engine hood structure on the radiator grille structure.

The foregoing and other important objects and desirable features inherent in and encompassed by the invention will become apparent to those skilled in the art as the disclosure is more fully made of a preferred embodiment of the invention in the following detailed description and accompanying sheets of drawings, in which Figure 1 is a side view, partly in section, of the forward portion of a tractor of a well known commercial type;

Figure 2 is a plan view, partly in section, of the structure shown in Figure 1, the wheel and axle having been omitted;

Figure 3 is a front elevational view, partly in section, as viewed along the line 3—3—3—3 in Figure 1, of the same structure;

Figure 5 is a plan view of a forward portion of the front body section, per se;

Figure 6 is a sectional view taken substantially along the line 6—6 of Figure 1 and further illustrating the relationship between the lower portion of the radiator and the front body section.

Figure 1:
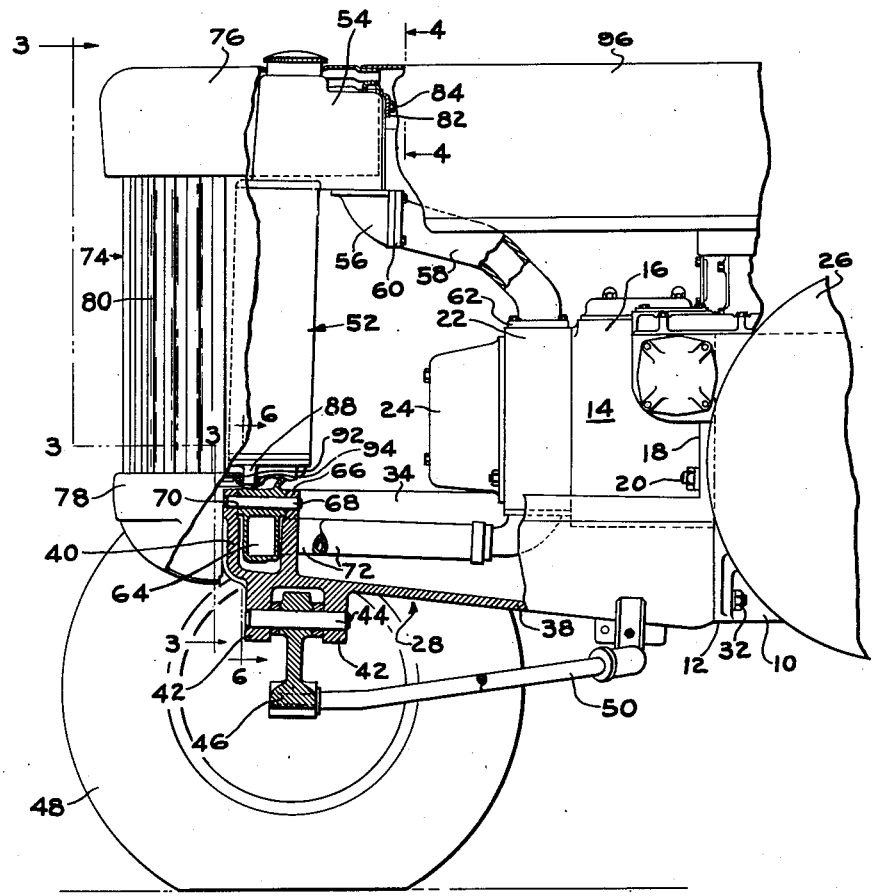
Figure 4:
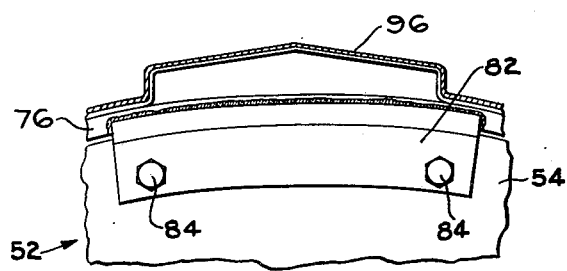
Figure 4 is an enlarged sectional view taken substantially along the line 4—4 of Figure 1 and showing the mounting of the radiator grille and enclosure structure on the upper portion of the radiator.

The tractor chosen for the purposes of illustration is of a well known commercial type and only the forward portion thereof has been illustrated and will be described. The tractor includes a rear body section 10 which extends longitudinally and which, as is conventional, carries the usual transmission and differential gearing (not shown) for the purpose of transmitting power to the rear traction wheels (also not shown). The forward portion of the rear body section 10 is flanged at 12 to provide for the rigid mounting thereon of an internal combustion engine, designated generally by the numeral 14. This engine includes a cylinder block 16, the principal axis of which is longitudinally and horizontally disposed with respect to the vehicle. The rear portion of the cylinder block is flanged at 18 so that it may be rigidly mounted on a forward face of the flange 12 on the rear body part 10, the latter being provided with studs 20 for this purpose. In the type of construction illustrated and described, the forward part of the rear body section 10 comprises the crank case for the engine 14 and the engine crank shaft axis is transverse to the longitudinal extent of the vehicle, as in the patent to McCray 1,919,069. Therefore, the engine 14 is a rigid part of the rear body section 10.

The engine illustrated is of the overhead-valve type and is shown as having a cylinder head 22 rigidly carried by the cylinder block 16 and provided with a forwardly disposed valve housing or cover 24. The numeral 26 designates generally the flywheel housing or cover at the left hand side of the tractor, a construction that is peculiar to the type of tractor illustrated, since the flywheel at the end of the transverse crank shaft is at the left side of the tractor.

The tractor body further includes a front section, designated generally by the numeral 28, which is preferably in the form of a casting having a rear transverse portion 30 that is rigidly secured to a front face portion of the flange 12 on the rear body part 10 (Figure 2), the numeral 32 indicating securing means for the purpose referred to. As best shown in Figure 6, the front frame section 28 is generally in the form of a U in transverse section and has right hand and left hand side portions or rails 34 and 36, respectively, these rails being joined by a transverse bottom portion 38. The forward end portions of the side portions or rails 34 and 36 are rigidly cross connected by a transverse front wall or structural portion 40 which is located a substantial distance forwardly of the forward portion of the engine 14. As will be seen in Figure 1, the upper portion of the transverse front wall 40 is substantially at the same level as the lower portion of the engine 14. A forward part of the bottom 38 of the frame section 28 is provided with a pair of depending ears 42 apertured in alignment longitudinally to receive a pivot pin 44 for the purpose of mounting the tractor on a transverse front axle 46, a construction which is generally conventional. The axle is provided at opposite ends with wheels, only one of which is shown at 48 in Figure 1. The axle 46 is braced longitudinally by a rearwardly extending bracing means, indicated generally at 50 and connected to a lower part of the rear portion of the bottom 38.

It may be well to note at this point that of the structure thus far described, all except the wheel and axle means may be considered the main body structure of the tractor, since all the components referred to are carried as a unit by the tractor wheels. It should be further noted that the engine 14 and body 10 are relatively closely and rigidly associated, whereas the forward portion 40 of the front frame section 28 is relatively remote from the rear body part 10. Still further, the inherent resiliency of the front frame section 28 necessarily means that the front frame section may be twisted about a generally longitudinally extending twisting axis. This is true, of course, of any rectangular structure such as that represented by the frame or body section 28. Considered otherwise, the rear portions or corners of the rectangle provided by the section 28 are rigidly anchored to the body portion 10; consequently, the opposite front corners may rise and fall, or have vertical deflection, with respect to the rear corners as the frame section 28 twists about the twisting axis referred to. Since the engine 14 is anchored to the same base as the rear corners of the frame section 28, the vertical deflection of the front corners of the frame section will be relative to the engine. Furthermore, the relative deflection between the parts just mentioned is of greater magnitude when considered with respect to upper portions of the engine 14, since the upper portions are further removed vertically from the longitudinal twisting axis.

With the foregoing in mind, the invention provides for the mounting of a coolant radiator 52 ahead of the engine 14 in such manner that torsional deflection of the forward portion of the frame section 28 is not transmitted to the radiator, or through the radiator to the parts attached thereto, such as the grille structure or engine hood structure or other parts connected to the latter. The radiator is illustrated as having an upper tank 54 having rigidly thereon mounting means including a pair of laterally spaced and rearwardly directed elbows 56. The mounting for the upper portion of the radiator further includes a pair of supporting means here shown as cast coolant-conducting members 58, the forward portion of each of which is flanged and rigidly secured to an elbow 56, as at 60, and the rearward portion of which is flanged at 62 and rigidly secured to the cylinder head 22. Inasmuch as the members 58 are rigidly interposed between the engine 14 and radiator 52, the latter is rigidly carried on the former. In other words, the radiator 52 is mounted at an upper portion of the engine 14 which is relatively remote from the forward portions of the front frame section 28.

The radiator 52 includes a lower tank 64 which extends downwardly behind the front wall 40 of the frame section 28 and between that wall and a rigid upstanding supporting ear or member 66 preferably cast rigid with a forward portion of the bottom 38 of the frame section 28. As best shown in Figure 5, the portion 66 is centrally between the opposite side portions 34 and 36 of the frame section 28, and the portions 40 and 66 are longitudinally apertured in alignment to receive a mounting member in the form of a longitudinal pivot pin 68 which passes through a longitudinal bore 70 in the lower radiator tank 64. The longitudinal axis of the pivot pin 68 is substantially coincident with what has been determined to be the longitudinal center or axis of twisting of the frame section 28. It is realized, of course, that the frame section 28 does not twist about any single axis, but it is commonly accepted that such central axis may be referred to for the purposes of general discussion. Such reference will suffice for the purposes of the present case. The axis of the pin 68 is substantially at the level of the upper portions of the side members or rails 34 and 36 and is further substantially coincident with the level of the lower portion of the engine 14. Since any relative deflection between the frame section 28 and engine 14 will take place substantially about the axis on which the pin 68 lies, it follows that the deflection will be of the same nature with respect to the radiator 52. It will thus be seen that the mounting comprising the parts 40, 66 and 68 not only permits lateral relative movement between the radiator 52 and frame section 28 about the axis of the pin 68 but also controls or confines the radiator 52 against undesirable fore and aft movements.

The lower tank 64 of the radiator is in coolant-conducting relationship with the cylinder head 22 of the engine 14 by means of a pair of coolant conduits here shown as rubberized fabric hoses 72 (Figures 1 and 6).

As stated above, it is an object of the invention to mount the radiator grille or enclosure structure directly on the radiator and independently of the front frame section. The radiator grille structure is designated generally by the numeral 74 and includes an upper shell section 76, a lower shell section 78 and an intermediate screen or grille section 80. The upper section 76 is constructed to enclose the upper radiator tank 54 and has a rear terminal edge provided with a depending flange portion 82 which is secured by a pair of cap screws 84 to a pair of laterally spaced mounting portions 86 on the upper radiator tank (Figure 2). The upper and lower sections 76 and 78 are structurally tied together by the intermediate screen or grille section 80 and the lower section 78 is rigidly carried by a lower portion of the radiator, preferably by means of a pair of laterally spaced mounting portions 88 respectively at opposite sides of a forward base portion of the lower radiator tank 64 (Figures 1 and 6). The lower grille structure section 78 includes a transverse member 90 which is formed with a transverse depending flange 92 at its rear end. The flange 92 is secured at laterally spaced points, as at 94, to the mounting portions 88 on the lower radiator tank 64 (Figures 1, 3 and 6). The upper section 76 is extended rearwardly to carry the forward portion of a longitudinally extending hood 96. Like the radiator grille section 74, the hood 96 is carried independently of the forward portion of the front frame section 28.

The preferred form of the invention as embodied in the construction set forth herein provides a radiator mounting and association of sheet metal parts that are a material advance over known constructions, in that these parts are mounted in such manner as to eliminate the possibility of damage thereto because of relative movement between the structural parts of the vehicle resulting from vibration inherent in the operation of the vehicle. Considering the main components of the vehicle structure, apart from the wheels and axles, as a body structure in general, it will be seen that the engine 14 comprises an upright part secured at the rear end of a torsionally flexible body part such as the frame section 28, and that the radiator 52 comprises a second part mounted at the opposite end of said torsionally flexible part. The upper portion of the radiator is carried on an upper portion of the engine 14, in the manner set forth above. The lower portion of the radiator is carried by the body structure exclusively on a portion of the body structure that has the least operational deflection relative to the engine. Since the radiator grille and hood structure are mounted on the radiator independently of any connection to the frame section 28, the same desirable results are achieved and flexing or vibrational effects of the frame section are not transmitted to the grille and hood structure.

It is not intended that the invention be limited to the precise details of construction set forth, for it is obvious that various modifications and alterations may be made in the preferred form of the invention without departing from the spirit and scope of the invention as set forth in the appended claim.

What is claimed is:

In a tractor having a longitudinal body including a rear main body housing provided with an upright mounting face: an internal-combustion engine extending forwardly from the main housing and having a rear portion rigidly secured to said upright mounting face and having a rigid forward upper portion disposed at a height a substantial distance above the level of the main housing; a forward frame in the form of a U having longitudinal side members disposed at opposite sides of and independently of the engine and secured at their rear ends to the main housing, and a transverse member rigidly cross-connecting the front ends of said members and disposed ahead and independently of the engine, said members lying at a level a substantial distance below the forward upper portion of the engine; a radiator positioned ahead of the engine and having upper and lower parts proximate respectively to the forward upper portion of the engine and to the transverse member of the frame; means rigidly connecting the upper part of the radiator to the forward upper part of the engine; and means pivotally connecting the lower part of the radiator to the central portion of said transverse member independently of the engine and on a longitudinal pivot below the level of said frame members.

BARRETT G. RICH.

REFERENCES CITED

The following references are of record in the file of this patent:

UNITED STATES PATENTS

| Number | Name | Date |
|---|---|---|
| 1,312,476 | Ford | Aug. 15, 1919 |
| 1,323,849 | Evans | Dec. 2, 1919 |
| 1,819,178 | Kegresse | Aug. 18, 1931 |
| 2,074,685 | Engstrom | Mar. 23, 1937 |
| 2,132,483 | Klespe | Oct. 11, 1938 |
| 2,221,546 | Johnston et al. | Nov. 12, 1940 |